UNITED STATES PATENT OFFICE.

BONNEVAL E. CHURCH, OF LONDON, ASSIGNOR TO JOHN DEWRANCE & CO., OF LAMBETH, ENGLAND.

PROCESS OF TREATING ASBESTUS.

SPECIFICATION forming part of Letters Patent No. 405,201, dated June 11, 1889.

Application filed April 1, 1889. Serial No. 305,541. (No specimens.) Patented in England October 23, 1888, No. 15,236.

*To all whom it may concern:*

Be it known that I, BONNEVAL E. CHURCH, a subject of the Queen of Great Britain, residing at No. 27 Warner Street, New Kent Road, S. E., London, England, have invented certain new and useful Improvements in the Process of Treating Asbestus, (for which I have received Letters Patent in Great Britain, No. 15,236, dated the 23d day of October, 1888;) and I do hereby declare that the following is a full, clear, and exact description of the invention, which will enable others skilled in the art to which it appertains to make and practice the same.

The invention relates to the treatment of asbestus which has been comminuted or broken into fibers, and which is to be cemented together to form all classes of packings and insulators.

The object of the invention is to treat such asbestus so that while it may be firmly bound together by a cementing material the expense of the treatment is greatly lessened, the process facilitated, and a composition formed which is elastic, easily molded or pressed to any desired shape, and can be readily vulcanized.

The invention consists in first reducing india-rubber gum from a solid to a gelatinous state by just enough naphtha or a similar solvent to dissolve the gum, and then mixing this with water, preferably by shaking or beating up the solution with warm distilled water, until the water is thoroughly mechanically mixed with and impregnates the gum and solvent solution, so as to distend it by dividing up and distributing the water-globules throughout the whole volume of the solution. To this sulphur or any other vulcanizing agent may be added. In this mechanically-mixed solution of rubber and naphtha and water the broken asbestus is forcibly kneaded, rolled, or pounded until the mass is thoroughly mixed, and it has been found the most dry and fluffy asbestus—the Canadian—can be more thoroughly and evenly saturated by this gelatinous solution with less gum-solvent than by prior processes. After the mixing of the asbestus and the above impregnated india-rubber solution is completed some of the water can be squeezed out by pressure, and the remaining water is then evaporated after the material is molded, rolled, or pressed to form the desired shape; or the fibers may be separated and calked into the grooves of cocks and valves and vulcanized by any well-known process. By thus mixing water with the dissolved rubber the use of a large quantity of the volatile, highly-inflammable, and expensive gum-solvent naphtha is dispensed with, and at the same time the mass is more easily and uniformly mixed with the cementing material than when the gum is reduced to a thin liquid by a large quantity of solvent, and the material is somewhat more elastic than when a large amount of solvent has to be evaporated to harden the gum to cement the fibers together.

A further advantage resides in the fact that the material produced by the present process can be molded with greater ease and more expeditely, as the large proportion of naphtha formerly used rendered the composition very slimy and liable to break away, whereas by this process the composition is very plastic and tenacious.

It has been found that instead of shaking or beating up the india-rubber solution with water before mixing it with the asbestus the asbestus may be soaked with water, then placed so soaked in the india-rubber solution, and then the composition is mixed, as above described.

I claim as my improvement—

1. The herein-described process of treating asbestus, which consists in mixing broken asbestus with a solution of rubber and naphtha, the particles of which are mechanically distended by water which has been forced thereinto, substantially as specified.

2. The herein-described process of treating asbestus, which consists in first mixing the broken asbestus with a solution of rubber and naphtha which has been mechanically distended by globules of water, then removing the water by pressure, and then forming the mass into the desired shape by heat and pressure, substantially as specified.

BONNEVAL E. CHURCH.

Witnesses:
HAROLD ADAMS,
JOSEPH H. ROSS.